RADIO RECEIVER WITH LOGARITHMIC RESPONSE CIRCUIT

Filed April 17, 1946 2 Sheets-Sheet 1

INVENTORS
EDMUND D. SCHREINER
BRADFORD HOWLAND
BY M. A. Hayes
ATTORNEY

April 17, 1951 E. D. SCHREINER ET AL 2,548,913

RADIO RECEIVER WITH LOGARITHMIC RESPONSE CIRCUIT

Filed April 17, 1946 2 Sheets-Sheet 2

*INVENTORS*
EDMUND D. SCHREINER
BRADFORD HOWLAND

*BY* M. A. Hayes

*ATTORNEY*

Patented Apr. 17, 1951

2,548,913

UNITED STATES PATENT OFFICE 2,548,913

RADIO RECEIVER WITH LOGARITHMIC RESPONSE CIRCUIT

Edmund D. Schreiner, Washington, D. C., and Bradford Howland, La Fayette, Ind.

Application April 17, 1946, Serial No. 662,766

2 Claims. (Cl. 250—20)

(Granted under the act of March 3, 1883, as amended April 30, 1928; 370 O. G. 757)

This invention relates to voltage control circuits and more particularly to voltage control circuits having an output logarithmical with respect to their input, and having negligible time delay.

An object of this invention is to provide an instantaneous means of automatically compressing the range of volume of modulated voltages in order not to overload or saturate circuits connected to the output thereof.

Another object of this invention is to provide an instantaneously acting automatic volume control means, that is simple, light and compact, and having no easily breakable parts.

Automatic volume control circuits of the prior art generally use a feedback from a detector to bias preceding amplifier tubes, and incorporate a time delay to prevent too fast action, and generally also have condensers in the circuit for filtering purposes. In any application where time delay is objectionable, conventional circuits involving the charging and discharging of condensers are not desirable.

The method used in attaining these objects has been to apply the voltage desired to be controlled, to a nonlinear device i. e. one whose impedance is not a constant but changes under different conditions of current and voltage. One example of such a device is a crystal diode such as that commercially designated as 1N34. In general, it is necessary to operate on a portion of the impedance characteristics of this device where the impedance changes rapidly with changes of voltage i. e. where a large change in input voltage is compressed to a small change in output voltage. To operate on this portion of the curve it is necessary to incorporate the nonlinear devices in a network. Several nonlinear devices may be used in shunt to obtain the desired output.

The nonlinear device, where it is incorporated into a substantially logarithmic response network may be used as an automatic volume control circuit, by inserting the logarithmic response circuit in series with other radio frequency stages. This involves no feedback and substantially no time delay, except for the charging of the associated capacitance of the nonlinear device, which is of the order of 3 micro-microfarads for a typical crystal diode.

Figure 1:
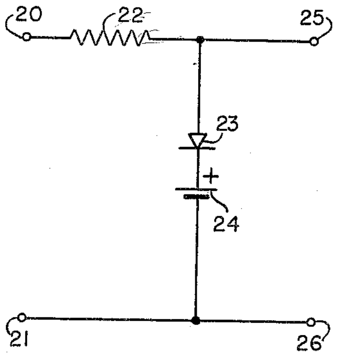
Figure 1 is a schematic diagram of a typical embodiment of the invention.

In reference to Figure 1, an exemplary embodiment of this invention is shown, comprising; a pair of input terminals 20 and 21, a connection including a fixed impedance 22, a biasing source 24 and a crystal diode 23 all connected in series across the input terminals, and a pair of output terminals 25 and 26 connected across the crystal diode 23 and the biasing source 24.

The general principle of operation of this circuit is somewhat analagous to that of an ordinary voltage divider circuit, except that it is complicated by the fact that it is the property of the nonlinear impedance element, 23, to change its impedance in response to the amplitude of the applied signal across terminals 20 and 21. Namely, the impedance of the nonlinear impedance element 23, diminishes with increased signal amplitude. Consequently by exercising some control over the impedance characteristic of diode 23, such as by means of the biasing source 24, shown as a battery and by properly selecting impedance element 22, in relation to the impedance of the diode 23, the voltage divider action of the circuit can be made so as to cause input signals, below a certain positive amplitude and negative signals, to appear at the output terminals 25 and 26 with substantially full amplitude. Whereas positive input signals having an amplitude above the same certain amplitude will cause the impedance of the diode 23 to diminish and consequently will appear at the output terminals very much compressed in amplitude, and in the circuit of Figure 1, the output signals have approximately a logarithmic relation to the input signals. The cutoff level below which input signals will appear substantially unattenuated at the output terminals, is established by selecting a voltage for the direct current source 24 such as to cause the diode 23, to operate at a point of its characteristic curve, as indicated on Figure 4 where the diode has substantially an infinite impedance, below that point.

Figure 3:
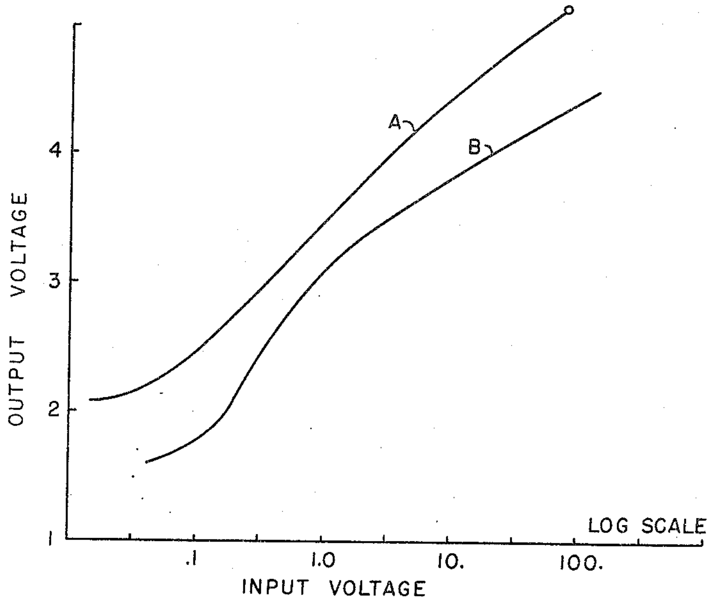
Figure 3 is a graph of signal input vs. signal output, showing the operating characteristic of the circuits of Figure 1 and Figure 2.
Figure 4:
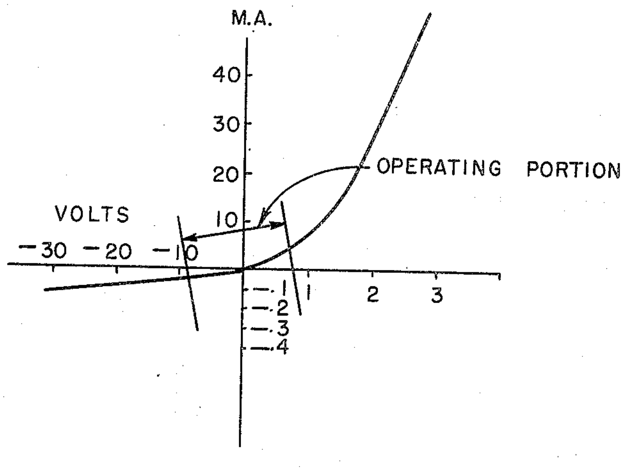
Figure 4 shows a typical characteristic curve of a nonlinear device.

Input signals which are of such an amplitude, as to drive the operating point of the crystal diode to the right on the curve of Figure 4, cause the impedance of the diode to drop, which consequently reduces the output signal to a value which approaches a logarithmic relation to the input signal. A curve which illustrates the approximate relationship between the input and the output voltages of the circuit of Figure 1 is shown as curve B in Figure 3. The embodiment illustrated in Figure 2, to which reference is now made, consists of two sections, connected in cascade, each similar to the circuit of Figure 1, the input section across input terminals 1 and 2, comprises a resistor 3, in one side of the line, followed by a resistor 5, a nonlinear device 7, and a D. C. voltage source 9, all three in series across the line. The path of easy current flow is as indicated from the resistor 5, to the nonlinear device and to the plus side of the D. C. voltage source.

Figure 2:
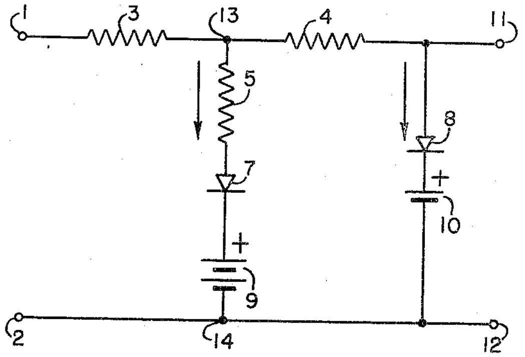
Figure 2 is a schematic diagram of another typical embodiment of the invention.

The second, or output section consists of a resistor 4, in the same side of the line as resistor 3, and connected to the junction of resistor 3 and resistor 5, followed by the nonlinear device 8, in series with the D. C. source 10, across the line and also across the output terminals 11 and 12. The path of easy current flow is from the nonlinear device to the plus side of the D. C. voltage source. The D. C. voltage sources 9 and 10 introduce a voltage delay in the operation of their associated nonlinear devices. In Figure 2 the D. C. voltage source 9 is greater than 10. The bias voltages further provide a voltage delay or a minimum level, below which the respective diodes represent substantially infinite impedances.

When E in exceeds voltage source 10, but not voltage source 9 current will flow through resistor 3, resistor 4, and nonlinear device 8, and the voltage developed across nonlinear device 8, plus that of source 10 will appear across terminals 11 and 12 shown as E out.

If the input voltage exceeds voltage source 9, current will flow from terminal 1 through resistor 3, resistor 5, nonlinear device 7, voltage source 9, back to terminal 2. The voltage developed across resistor 5, plus that developed across nonlinear device 7, plus that of voltage source 9, will then appear across points 13 and 14. If this voltage is less than voltage source 10, it will also appear across the output terminals 11 and 12. If the voltage across points 13 and 14 is greater than source 10, current will flow through nonlinear device 8, and the voltage across the nonlinear device 8, plus that across the voltage source 10, will appear as E out across terminals 11 and 12. A curve illustrating the approximate relationship between the input and output voltages of the circuit of Figure 2 is shown at A in Figure 3. By suitably choosing the components, the number of sections, and the biasing voltages with respect to the output characteristics desired and the input characteristics specified, great flexibility may be obtained.

Figure 5:
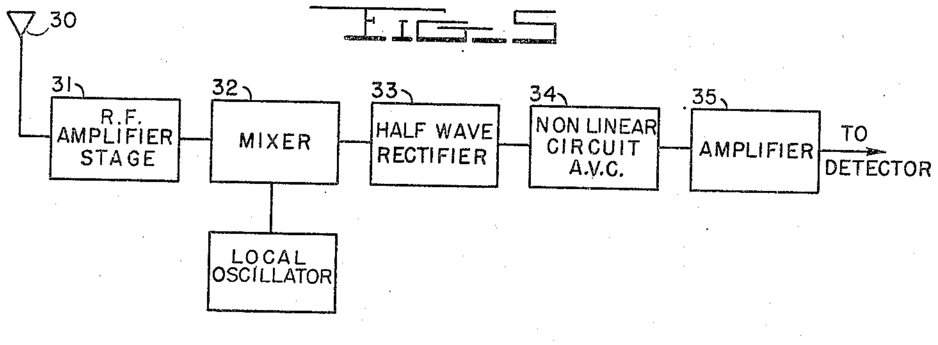
Figure 5 is a block diagram of the invention used as an automatic volume control circuit in a radio frequency receiving system.

Figure 5, to which reference is now made, shows in block diagram form the utilization of the logarithmic response circuit as an automatic volume control circuit, in combination with other components of a modulated carrier wave system. Radio frequency energy is received from the antenna 30 by the R. F. amplifier 31, and fed to the mixer 32, and then to the half wave rectifier 33, thru the logarithmic response network 34 to the amplifier 35, and to the second detector. If the input signal, to the logarithmic response network, has both positive and negative components, with reference to the operating point on the characteristic curve, the positive portions will be attenuated logarithmically, and the negative portions will not be attenuated. Therefore it is necessary to rectify the modulated signal and apply it to the logarithmic response network as a unidirectional signal.

If a voltage of the form;

$$E=A(1+m \sin wt)$$

is fed into the logarithmic response network; where

A=Input signal strength factor
$m$=Percent modulation

Then the output of the automatic volume control circuit will be substantially as follows;

$$E \text{ out } \alpha \text{ Log } E \text{ in}$$
$$E \text{ out } \alpha \text{ Log } A(1+m \sin wt)$$
$$E \text{ out } \alpha \text{ Log } A+\text{Log } (1+m \sin wt)$$

It is noted that change in the input signal strength A, does not influence the amplitude of the modulation component, $(1+m \sin wt)$. Therefore the desired component, the modulation, will be held constant even though the signal level A changes.

Although we have shown and described only limited and specific embodiments of the present invention we are fully aware of the many modifications possible thereof. Therefore this invention is not to be limited except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. A modulated wave carrier receiving system comprising an amplifier section, a demodulator, a half wave rectifier connected to the output of the said amplifier section and a logarithmic response network connecting the output of said rectifier to the demodulator of said receiving system, said last named network comprising, a pair of input terminals, a first series connection across said input terminals, said connection including an impedance element, and a nonlinear impedance device, a second series connection also including an impedance element and a nonlinear impedance device connected in shunt with a portion of the said first series connection, and a pair of output terminals connected across said nonlinear impedance device of said second series connection.

2. A modulated carrier wave receiving system comprising an amplifier section, a demodulator, a half wave rectifier connected to the output of the amplifier section and a logarithmic response network connecting the output of said rectifier to the input of said demodulator comprising a pair of input terminals and a pair of output terminals, an impedanceless connection between one terminal of the input and output pairs, a high impedance connection between the other terminal of the input and output pairs, and a series connection comprising a diode non-linear impedance device and a biasing source connected across the ouput terminals, said biasing source being disposed to oppose the flow of current through said diode impedance device and proportioned to provide said device with a normally high impedance under low amplitude signal conditions.

EDMUND D. SCHREINER.
BRADFORD HOWLAND.

(References on following page)

REFERENCES CITED

The following references are of record in the file of this patent:

UNITED STATES PATENTS

| Number | Name | Date |
|---|---|---|
| 1,875,157 | Roberts | Aug. 30, 1932 |
| 2,014,509 | Roosenstein et al. | Sept. 17, 1935 |
| 2,084,135 | Ford | June 15, 1937 |
| 2,088,210 | Koch | July 27, 1937 |
| 2,104,336 | Tuttle | Jan. 4, 1938 |
| 2,182,329 | Wheeler | Dec. 5, 1939 |
| 2,227,050 | White et al. | Dec. 31, 1940 |
| 2,239,906 | Tuxen | Apr. 29, 1941 |
| 2,250,581 | Heinecke | July 29, 1941 |
| 2,337,932 | Rogers | Dec. 28, 1943 |
| 2,383,420 | Scoles | Aug. 21, 1945 |
| 2,434,155 | Haynes | Jan. 6, 1948 |